(12) United States Patent
Nagy et al.

(10) Patent No.: US 7,874,135 B2
(45) Date of Patent: Jan. 25, 2011

(54) HARVESTER ADAPTER WITH STALK SHREDDER FOR HARVESTING GRAIN CROPS, PARTICULARLY SUNFLOWER

(75) Inventors: Lajos Nagy, Bekes (HU); Kornel Gyenes, Tiszafoldvar (HU); Gyorgy Lipusz, Bekes (HU); Gabor Sagi, Bekescsaba (HU); Imre Takacs, Bekes (HU); Gabor Kincses, Tarhos (HU); Laszlo Szalkai, Bekes (HU)

(73) Assignee: Optigep KFT, Bekes (HU)

( * ) Notice: Subject to any disclaimer, the term of this patent is extended or adjusted under 35 U.S.C. 154(b) by 0 days.

(21) Appl. No.: 12/524,560

(22) PCT Filed: Jan. 25, 2008

(86) PCT No.: PCT/HU2008/000008

§ 371 (c)(1),
(2), (4) Date: Jul. 24, 2009

(87) PCT Pub. No.: WO2008/104816

PCT Pub. Date: Sep. 4, 2008

(65) Prior Publication Data

US 2010/0083627 A1    Apr. 8, 2010

(30) Foreign Application Priority Data

Jan. 26, 2007   (HU)   .................................. 0700093

(51) Int. Cl.
*A01D 34/42* (2006.01)
(52) U.S. Cl. ...................................................... 56/504
(58) Field of Classification Search .................. 56/503, 56/500, 13.6, 13.5, 6, 504, 10.2 G, 98, 106, 56/111

See application file for complete search history.

(56) References Cited

U.S. PATENT DOCUMENTS

| 3,469,378 | A | * | 9/1969 | Heesters et al. | ............... 56/11.9 |
| 3,623,300 | A | * | 11/1971 | König et al. | ...................... 56/6 |
| 3,646,732 | A | * | 3/1972 | Konig et al. | .................. 56/13.6 |
| 3,796,268 | A | * | 3/1974 | Porter | ........................ 171/88 |
| 3,857,225 | A | * | 12/1974 | Knudson | .................... 56/13.6 |
| 3,984,966 | A |   | 10/1976 | Outtier | |

(Continued)

FOREIGN PATENT DOCUMENTS

DE    4013591 A  * 10/1991

(Continued)

*Primary Examiner*—Árpád Fábián-Kovács
(74) *Attorney, Agent, or Firm*—Birch, Stewart, Kolasch & Birch, LLP

(57) ABSTRACT

The harvester adapter has a frame structure, for attachment to a combine harvester. At least two crop gathering units are secured to the frame structure. Adjacent crop gathering units are arranged such that a channel with an open leading end is formed between them, with a stalk gathering unit being disposed in driving connection with a harvesting mechanism on at least one side of the channels. The adapter has a collecting auger disposed rearward from the harvesting mechanism and at least one stalk shredder unit attached to the frame structure. The speed of the stalk gathering unit is continuously adjustable by control orders given by the combine harvester and/or by a speed meter disposed on the adapter and/or by the operator, and the stalk shredder units are attached to the frame structure such that their position is adjustable in a direction perpendicular to the direction of travel.

5 Claims, 7 Drawing Sheets

U.S. PATENT DOCUMENTS

Figure 1:
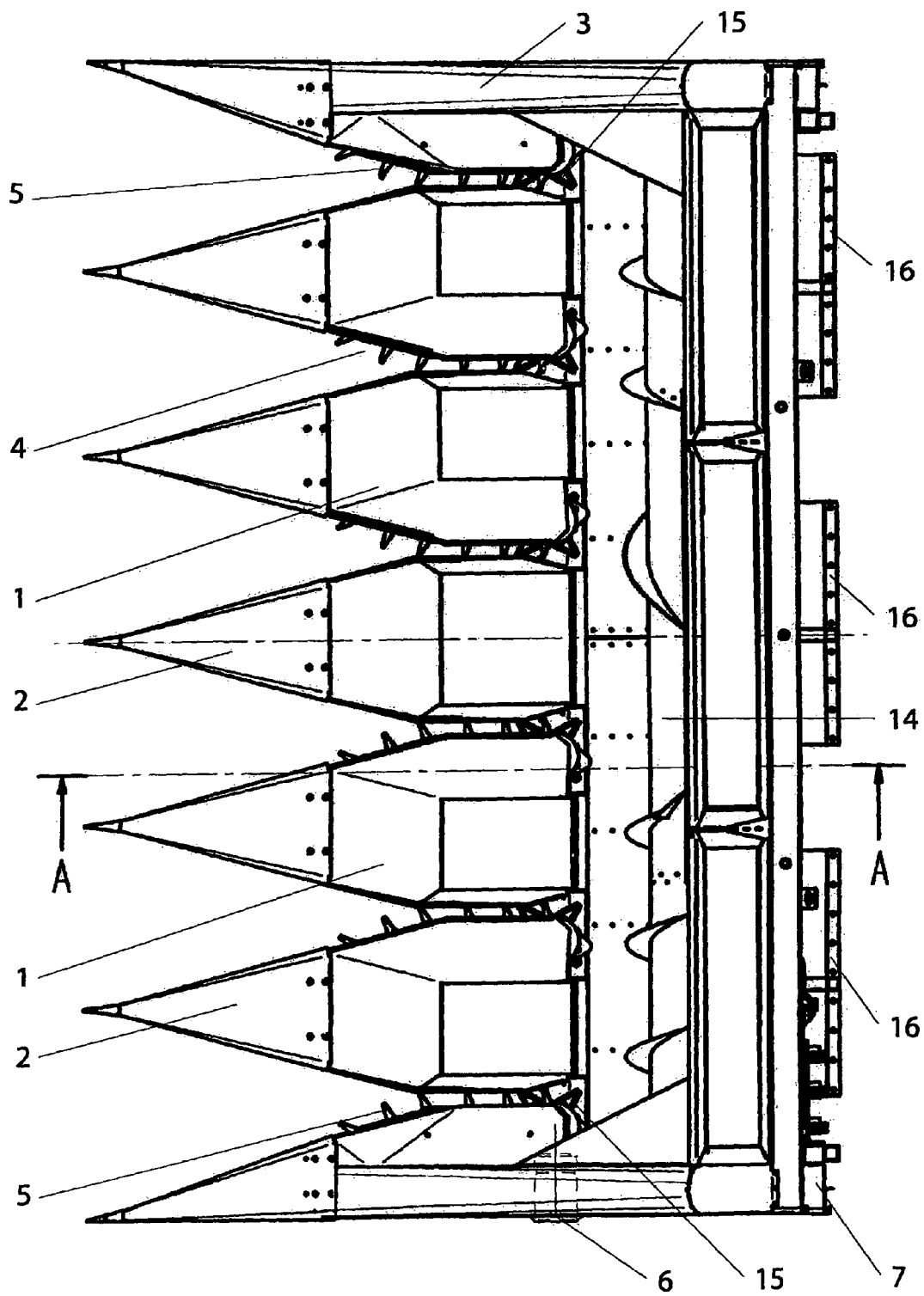

| | | | |
|---|---|---|---|
| 4,009,557 A * | 3/1977 | Reicks | 56/98 |
| 4,218,865 A * | 8/1980 | Chaumont et al. | 56/13.6 |
| 4,237,681 A * | 12/1980 | Zantzinger, Jr. | 56/27.5 |
| 4,286,423 A * | 9/1981 | Caldwell et al. | 56/6 |
| 4,343,138 A * | 8/1982 | Neuerburg | 56/15.9 |
| 4,434,606 A | 3/1984 | Rhodes et al. | |
| 4,441,307 A * | 4/1984 | Enzmann | 56/208 |
| 5,060,462 A * | 10/1991 | Helfer et al. | 56/14.9 |
| 5,094,063 A * | 3/1992 | Wattron et al. | 56/6 |
| 5,107,663 A * | 4/1992 | Wattron et al. | 56/15.7 |
| 5,330,114 A | 7/1994 | Trenkamp et al. | |
| 5,704,202 A | 1/1998 | Calmer | |
| 5,845,472 A * | 12/1998 | Arnold | 56/94 |
| 5,921,070 A | 7/1999 | Chamberlain | |
| 5,934,054 A * | 8/1999 | Landeis | 56/14.3 |
| 6,055,800 A * | 5/2000 | Walch | 56/16.7 |
| 6,238,170 B1 * | 5/2001 | Pingry et al. | 414/550 |
| 6,318,055 B1 * | 11/2001 | Bird | 56/6 |
| 6,655,118 B1 * | 12/2003 | Thompson et al. | 56/15.8 |
| 7,658,056 B2 * | 2/2010 | Thompson et al. | 56/15.8 |
| 2003/0221401 A1 * | 12/2003 | Ligouy | 56/14.7 |
| 2006/0277885 A1 * | 12/2006 | Rauch | 56/94 |
| 2007/0170669 A1 * | 7/2007 | Ehrhart | 280/43.23 |

FOREIGN PATENT DOCUMENTS

| | | |
|---|---|---|
| DE | 4015326 | 10/1991 |
| EP | 1378159 | 1/2004 |
| FR | 2418621 | 9/1979 |
| FR | 2723503 A1 * | 2/1996 |
| FR | 2779904 | 12/1999 |
| GB | 2232055 A * | 12/1990 |
| HU | 178941 | 7/1982 |
| HU | 184307 | 8/1984 |
| HU | 3068 U | 2/1986 |
| HU | 191166 | 8/1986 |
| HU | 220027 | 5/1997 |
| HU | 211802 | 2/2001 |
| HU | P0301588 | 8/2005 |

* cited by examiner

HARVESTER ADAPTER WITH STALK SHREDDER FOR HARVESTING GRAIN CROPS, PARTICULARLY SUNFLOWER

This Application is the National Phase Under 35 U.S.C. §371 of PCT International Application No. PCT/HU2008/000008 which has an International filing date of Jan. 25, 2008, which claims priority to Hungary Application No. P0700093 filed on Jan. 26, 2007. The entire contents of all applications listed above are hereby incorporated by reference.

BACKGROUND OF THE INVENTION

The invention relates to a harvester adapter with stalk shredder for harvesting grain crops, particularly sunflower, comprising a frame structure attached to a combine harvester, at least two crop gathering units having a snout, the crop gathering units being secured to the frame structure, where neighbouring crop gathering units are arranged such that a channel with an open leading end is formed between them, and where a stalk gathering unit is disposed in driving connection with a harvesting mechanism on at least one side of the channels, and further comprising a collecting auger disposed rearward from the harvesting mechanism and at least one stalk shredder unit attached to the frame structure.

Grain crops, such as sunflower or corn are usually harvested with combine harvesters equipped with adapters (or, to use a more widespread term, "headers"). The adapters or headers have stalk guiding means adapted for guiding the stalks to a harvester unit comprising reciprocating or rotating cutting means. A crop conveying means adapted for conveying the gathered crops to the harvester through a throat is connected to the cutting means. Such adapters are disclosed among others in patent descriptions HU 220 027 and HU 184 307.

Seeds easily drop from mature grain heads of many grain crops, particularly sunflower. This may adversely affect grain losses, particularly if crops to be harvested are down or are entangled. Under favourable circumstances, grain loss is as low as 5-6% but it can easily increase to 10-20%.

A number of solutions have been proposed to reduce grain loss. According to Hungarian patent HU 178 941 seeds dropped inside the harvester machine are gathered by a rearwardly sloping envelope extending along both sides of crop rows. For harvesting short-stalk and/or down crops the adapter has to be lowered. In this position the slope of the envelope becomes insufficient for urging dropped grains towards the rear of the envelope.

A row-type harvesting machine is disclosed in patent description HU 211 802. The machine of the invention has snouts arranged corresponding to the row spacing, extending along both sides of rows. The snouts are rotatable about a hinge point and are connected to a vibrated envelope attached to a frame structure. An active stalk guiding mechanism and a harvesting mechanism are disposed under the vibrated envelope, with one or more one grain collecting means being disposed rearward from them. The stalk guiding mechanism extends into an open leading-end channel formed between the portions of the vibrated envelope. The stalk guiding mechanism is implemented utilizing guide chains. The harvesting machine according to the invention is suitable for harvesting down crops or short-stalk crops with minimal grain loss. A disadvantage of the design is that it cannot exploit the full potential of the harvester machine because the speed of the harvester is limited by the constant speed of the stalk guiding and harvesting units.

In sunflower fields harvested with headers conventionally applied a stubble with a height of 50-100 cm remains after harvesting is completed. The stubble is usually processed in a separate step using stalk shredder machines. The multiple-step harvesting process is time consuming and requires an extremely high amount of energy.

A known art solution is the sunflower harvesting adapter NAS 676 made by OPTIGÉP Kft. (www.optigep.hu). Apart from stalk gathering and harvester units this adapter also comprises stalk shredder units mounted on its frame structure. The stalk shredder unit consists of rotors driven through roller chains from two sides. The rotors are disposed on a common beam with a spacing corresponding to the row spacing. Because of its mounting height the adapter has a relatively large ground clearance and therefore it is disadvantageously incapable of harvesting down crops and crops having stalks lower than 1 m.

BRIEF SUMMARY OF THE INVENTION

The general object of the present invention is to provide an adapter capable of harvesting in an energy-saving and time-saving manner not only high-standing sunflower stands but also down crops or entangled crops with minimal grain loss.

We have recognised that in case the stalk gathering unit is implemented such that the speed thereof is continuously adjustable, the speed of the combine harvester can be synchronized with the speed of the stalk gathering unit (in other words, the speed of the stalk gathering unit may be adjusted to the translation speed of the combine harvester). Thus, a higher translation speed may be chosen for harvesting a clear and thin stand, whereas for harvesting entangled or weedy crops the translation speed may be lowered. In case the speed of the stalk gathering unit is adjustable, the difference between the uphill and downhill speed of the harvester may be taken into account and may be exploited. The combine operator may also decide to modify the harvesting speed if conditions require so.

The energy demand of the harvesting operation is fairly low (many times lower than the energy supply the combine harvester can provide). We have also recognised that in case the stalk shredder unit is mounted on the frame of the adapter such that—in addition to the adjustability of the angle between the rotors and the ground and the adjustable ground clearance—the unit is retractable in its terminal position under the frame of the adapter, crops with low stalk height and/or down crops may be cut down simultaneously with the harvesting operation.

The objective of the present invention is accomplished by the adapter described in the introductory paragraph of this description such that the speed of the stalk gathering unit is continuously adjustable by control orders given by the combine harvester and/or by a speed meter disposed on the adapter and/or by the operator, and the stalk shredder units are attached to the frame structure such that their position is adjustable in a direction perpendicular to the direction of travel.

According to a conceivable embodiment of the invention the adapter is attached to a harvester machine, for instance a combine harvester. A self-propelled harvester machine equipped with the inventive adapter also falls into the scope of the present invention. The adapter is also suitable for multi-row harvesting of grain crops. The efficiency of the harvesting operation may be increased by increasing the number of rows harvested simultaneously. Road travel of combines with over-size adapters attached may be facilitated by implementing the frame of the adapter in a collapsible configuration, for example in a manner described in utility model HU 3068 U. The inventive adapter may be produced with collapsible as well as with fixed frames. In addition to harvesting row crops, the adapter according to the invention is suitable for harvesting rowless or broadcast planted crops as well as for processing the stubble remaining in field. In case of rowless crops the width of the adapter and the arrangement of the stalk shredder units is determined according to economic considerations.

The present invention is an improvement over the adapter described in Hungarian patent HU 211 802. The adapter has crop gathering units corresponding in number to the rows to be harvested simultaneously or to the intended width of the strip to be harvested in a single step. Adjustable snouts are attached to the leading end of the crop gathering units. The crop gathering units are fixed to the frame structure of the adapter. Crop gathering units are secured to the frame structure such that a channel with an open leading end is formed between two neighbouring units. Preferably at least on one side of the channels stalk gathering units are disposed extending into the open channels. The stalk gathering units are in driving connection with a harvesting mechanism. According to a preferred embodiment of the invention the stalk gathering unit is implemented utilizing guiding chains. The harvesting mechanism comprises rotary and stationary knives. The drive shaft of the guiding chain is implemented coaxially with the shaft of the rotary knives of the harvesting mechanism. In a further preferred embodiment of the inventive adapter the stalk gathering unit and the harvester unit may be implemented as two structurally separate units that are in driving connection with each other.

The rotational speed of the input shaft of the stalk gathering units—and therefore the speed of the stalk gathering units themselves—is continuously adjustable. The speed adjustment may be controlled utilizing a signal coming from the speed meter of the combine and/or from a speed meter disposed on the adapter. According to a further preferred implementation the speed of the stalk gathering unit is adjustable upon order by the operator. The stalk gathering unit may be driven by mechanical, hydraulic or electric means. Accordingly, speed adjustment may be carried out in different ways under the scope of the present invention. According to a preferred embodiment of the invention the stalk gathering units are driven through hydraulic drive means, the hydraulic drive means comprising a pump driven by a chain drive and a hydraulic motor, where the hydraulic motor is directly connected to the input shaft of the stalk gathering unit with an angular gear drive.

The inventive adapter is also equipped with stalk shredder units. The configuration of the stalk shredder units themselves is known from prior art, such as from the stalk shredder-equipped adapter produced by OPTIGÉP Kft. The number of the stalk shredder units may be determined to correspond to the size of the area to be harvested or corresponding to the row spacing. According to a further preferred embodiment of the invention the stalk shredder units comprise multiple rotors disposed for rotation in a common housing, where the distance between the rotor shafts is adjustable with respect to the row distance of the crop to be harvested. According to another preferred implementation, two counter-rotating rotors are disposed in a single common housing.

The stalk shredder units may be driven by mechanical or hydraulic drive means. According to a preferred implementation the stalk shredder units are driven by hydraulic drive means, where the hydraulic drive means comprises a pump driven by a chain drive, with one pump being installed for each stalk shredder unit and also comprises hydraulic motors adapted for driving the stalk shredder units. In a preferred embodiment the hydraulic drive means of the stalk gathering unit and the stalk shredder units have a common oil tank.

The stalk shredder units are attached to the frame structure of the adapter in a manner that their position is adjustable in a direction perpendicular to the direction of travel. The adjustability of the stalk shredder units involves on the one hand that the units are arranged such that their above ground height is adjustable and on the other hand that the angle between the plane of the rotors and the ground can be adjusted. The stalk shredder units may be suspended utilizing mechanically or hydraulically operated movable levers. According to a preferred embodiment of the invention the stalk shredder units are suspended on the frame structure by means of levers adapted for rotation about joints. According to another preferred implementation the stalk shredder units are suspended on the frame structure of the adapter by three levers, where the length of the forward lever is adjustable and the length of the two rearward levers is fixed. Such a configuration provides that the angle between the rotors' plane and the ground can be modified to match characteristics of different harvester machines.

The ground clearance of the stalk shredder units may be adjusted to match ground conditions and requirements set by the crops to be harvested. Consequently, the height of stalks left as stubble may also be adjusted. According to a further preferred embodiment of the invention the stalk shredder units are retractable under the frame structure in their terminal position.

BRIEF DESCRIPTION OF THE SEVERAL VIEWS OF THE DRAWING(S)

Figure 2:
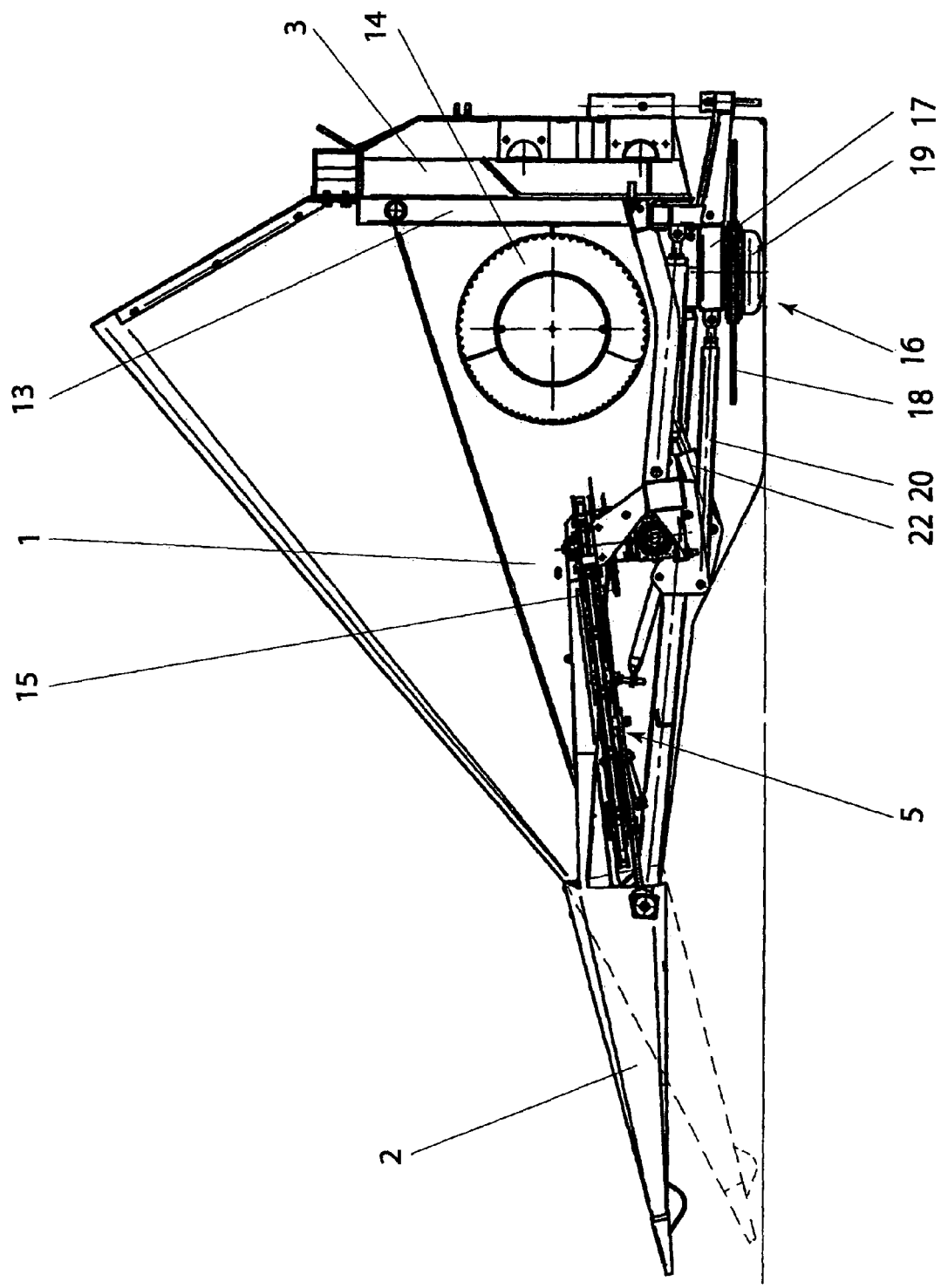
Figure 3:
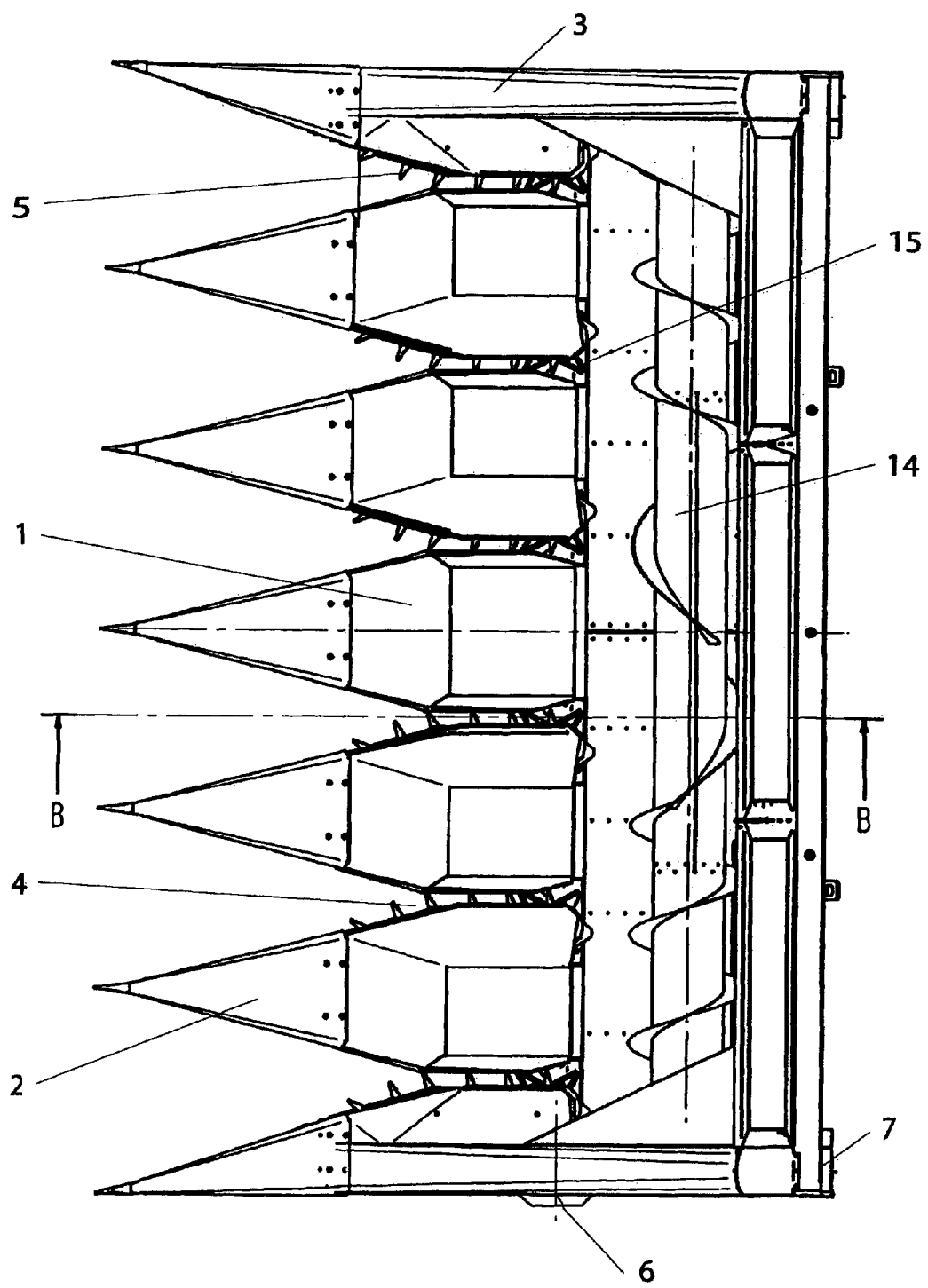
Figure 4:
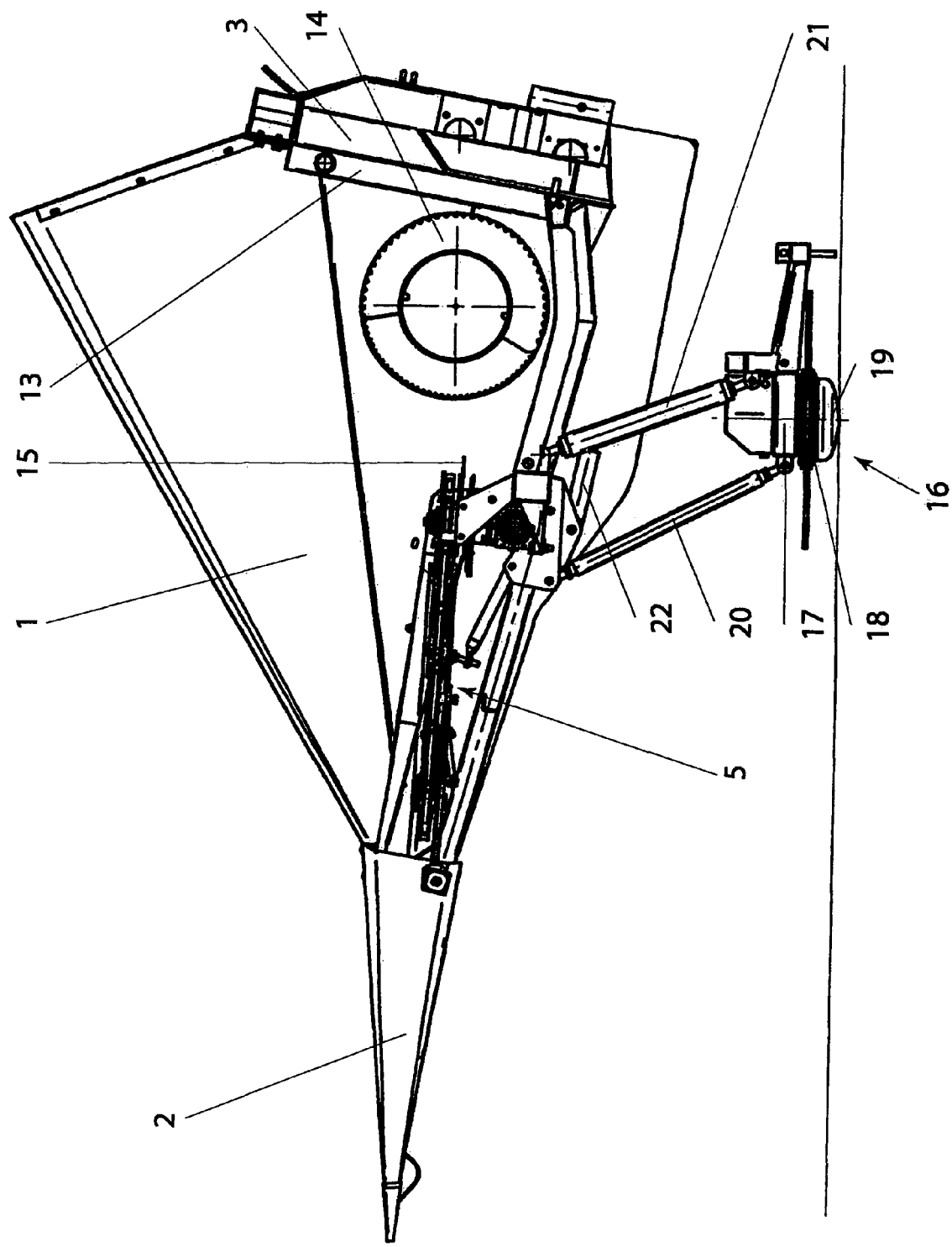
Figure 5:
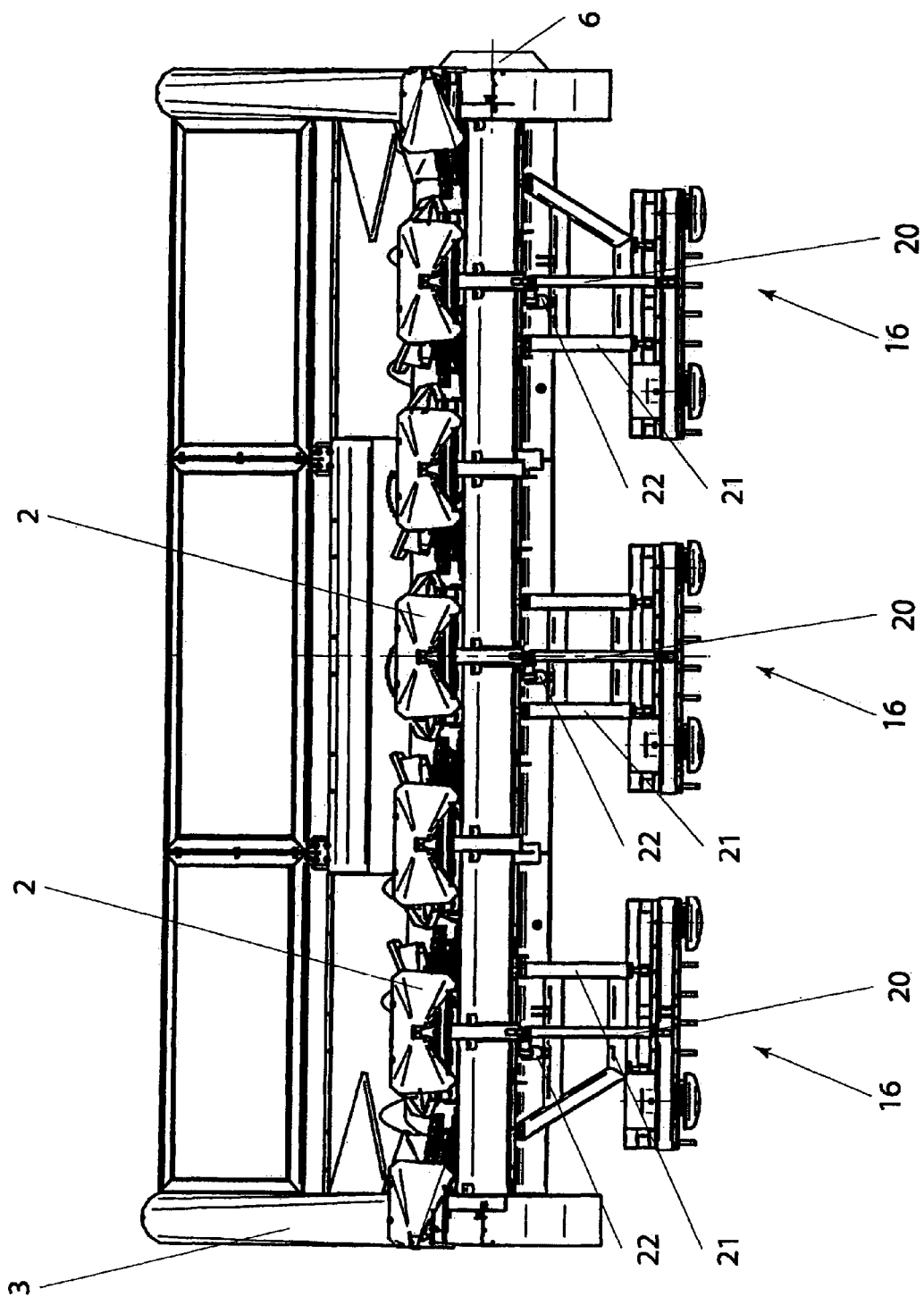
Figure 6:
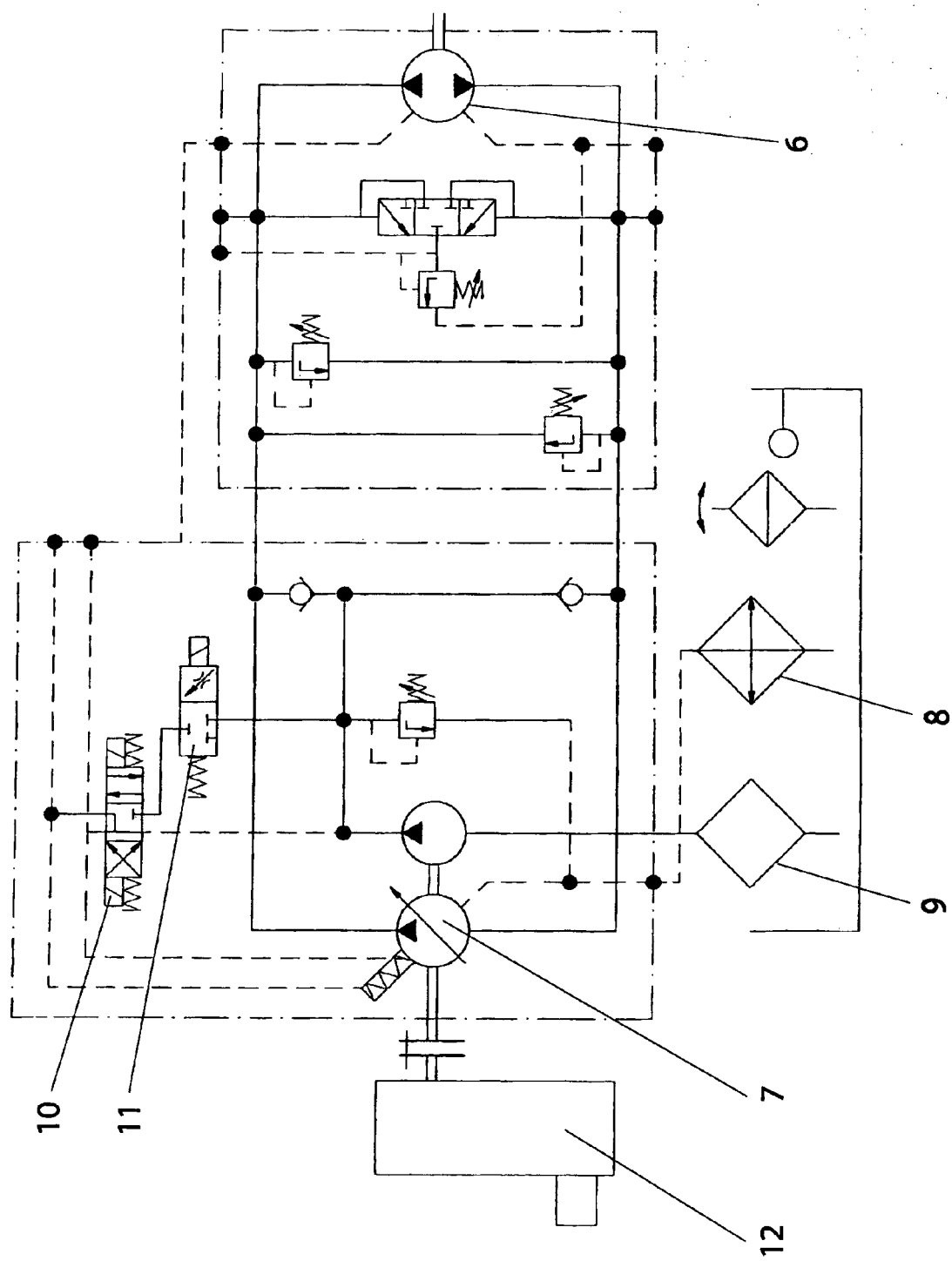
Figure 7:
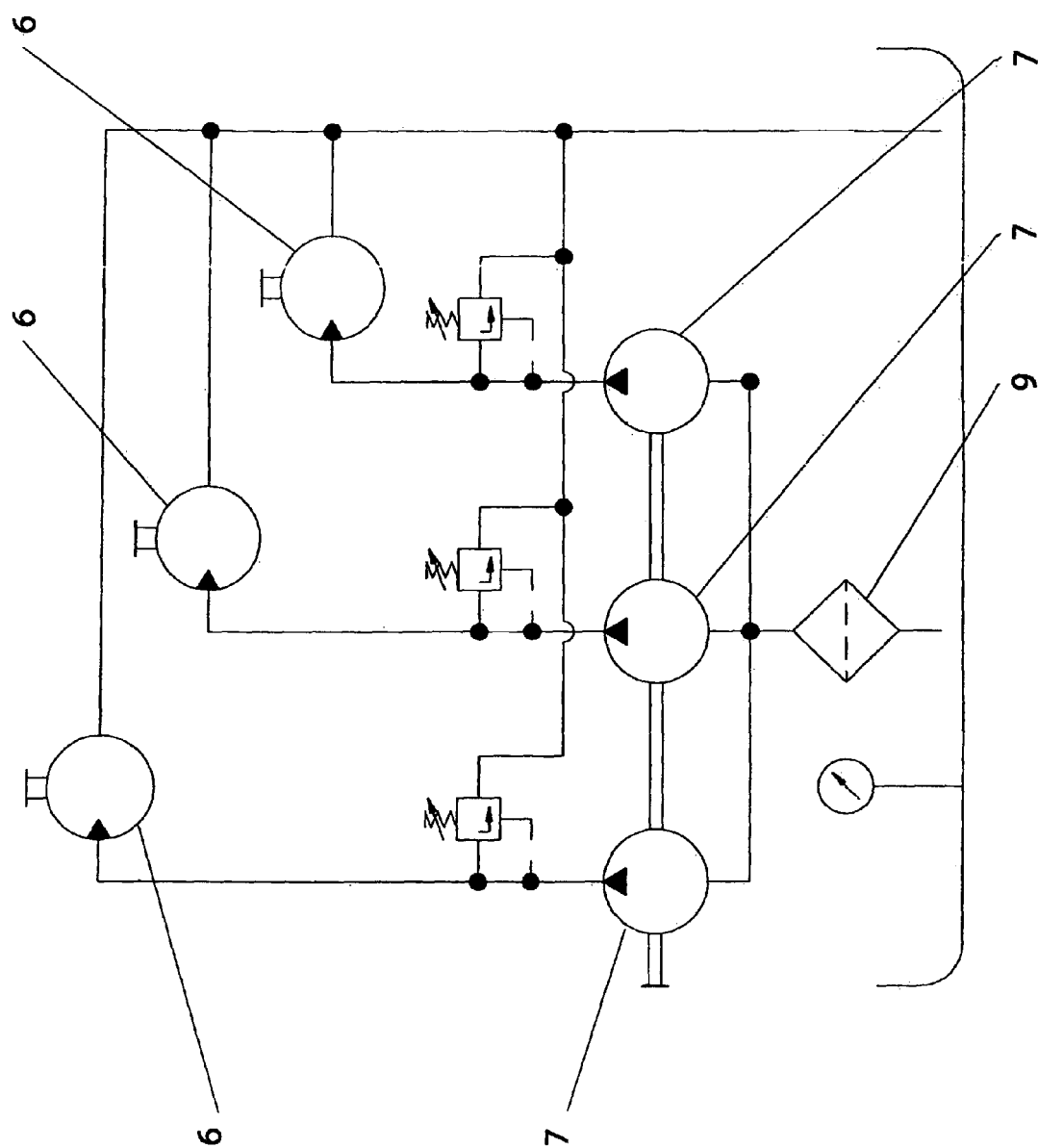

Details of the invention will be described referring to the attached drawings, where FIG. 1 is the top plan view of the inventive adapter with the stalk shredder units fully lifted, FIG. 2 is a section of FIG. 1 taken along line A-A, FIG. 3 shows the top plan view of the inventive adapter with the stalk shredder units fully descended, FIG. 4 is a section of FIG. 3 taken along line B-B, FIG. 5 shows the front view of the inventive adapter with stalk shredder units fully descended, FIG. 6 is the block diagram of the hydraulic drive means of the stalk gathering unit, and FIG. 7 is the block diagram of the hydraulic drive means of the stalk shredder unit.

DETAILED DESCRIPTION OF THE INVENTION

FIGS. 1-5 show the top plan and front views of the adapter according to the invention, illustrating the stalk shredder units 16 in their fully lifted and descended states. The adapter illustrated in the drawings has a fixed (non-collapsible) frame structure and is capable of simultaneously harvesting six rows. Crop gathering units 1 of the adapter comprise forwardly attached snouts 2 and are attached to the frame structure 3 such that channels 4 are formed between neighbouring units. Stalk gathering units 5 implemented utilizing guiding chains extend into the channels 4. The drive shaft of the stalk gathering units 5 is also applied for driving harvester units 15. A collecting auger 14 is disposed transversely to the channels 4 rearward from the crop gathering units 1. The portions of the collecting auger 14 are provided respectively with left-handed and right-handed screw blades. Three stalk shredder units 16 are attached to the frame structure 3 of the adapter. The adapter is shown in FIGS. 1 and 2 with the stalk shredder units fully lifted, while FIGS. 3-5 illustrate the adapter with the stalk shredder units 16 in a fully descended state.

The driving shaft of the stalk gathering unit 5 is driven through an angular gear drive by a hydraulic motor 6 disposed in a hydraulic drive means. A pump 7 and an oil tank 13 are disposed on the backside of the adapter.

The block diagram of the hydraulic drive means is shown in FIG. 6. Pump 7 is driven through a chain drive 12. A directional control valve 10 is applied for determining the direction of rotation of the hydraulic motor 6, while a proportional valve 11 is utilized to control the speed of the motor. The hydraulic drive means also comprises a filter 9 at the suction branch, a cooler 8, and other conventionally utilized elements such as a thermometer, pressure relief valves, check valves, etc. In FIG. 6 the circuit elements are designated by the symbols conventionally associated with them. The rotational speed may be adjusted utilizing the signal of the speed meter on the combine harvester to synchronize the speed of the stalk gathering unit 5 with the translation speed of the combine. The rpm of the input shaft of the stalk gathering unit 5 of the exemplary adapter is continuously adjustable in the range of 250-700 1/min, which corresponds to a translation speed range of 5-12 km/h.

The rpm of the hydraulic drive mechanism may also be adjusted by operator action. Manual adjustment may be necessary when working on sloping terrain or harvesting down crops. An adjustment range of ±15% is usually sufficient for most purposes.

The adapter illustrated in the drawings is equipped with three vertical-axis stalk shredder units 16. The configuration of the stalk shredder units 16 is known per se, each unit comprising two counter-rotating rotors 18 mounted on bearings in a common housing 17. Stalk shredder units 16 are mounted on adapter such that their rotors 18 are oriented to follow the principal direction of the rows of crops to be harvested. Due to their high peripheral speed the rotors 18 effectively shred stalks and stubble remaining in field after the harvester unit 15. To ensure that a minimum stubble height is maintained, separately journalled rotatable sliding discs 19 are attached to the bottom of the rotors 18.

The manner of attaching the stalk shredder units 16 to the frame structure 3 is illustrated in FIG. 2, FIG. 4, and also FIG. 5 that shows the front view of the adapter. Securing levers are pivotally joined to the stalk shredder unit 16. A forward lever 20 and two rear levers 21, disposed rearward from the forward levers 20, are attached to the housing 17 of the stalk shredder units 16. The forward lever 20 and the rear levers 21 are pivotally connected to the frame structure 3. The length of the forward lever 20 is adjustable, whereas the rear levers 21 have fixed length. This so-called parallelogram suspension provides that the angle between the rotors of the stalk shredder units 16 and the ground can be adjusted.

The stalk shredder units 16 are driven by hydraulic drive means. FIG. 7 shows the block diagram of the hydraulic drive means of the stalk shredder units 16. Pumps 7 are driven via a chain drive not shown in the drawing. The block diagram of the hydraulic circuit contains pumps 7, hydraulic motors 6, and other commonly applied elements such as a filter 9, a thermometer, and pressure relief valves. Oil is fed to the hydraulic motors 6 of the stalk shredder units 16 through hoses disposed inside the rear levers 21. Pumps 7 are mounted on the backside of the adapter. The stalk gathering unit 5 and the stalk shredder units 16 share a common oil tank 13.

Stalk shredder units 16 are lifted and descended by hydraulic cylinders 22 acting upon the rear levers 21. The hydraulic system of the combine harvester is applied for operating the hydraulic cylinders 22. To provide for quick mounting and dismounting, locking pins are utilized to connect the stalk shredder units 16 to the frame while the hydraulic hoses are connected with quick-connect couplers.

As the combine harvester advances in the field, snouts 2 direct plants to be harvested into the channels 4 formed between neighbouring crop gathering units 1. The stalk gathering units 5 further direct the plants towards the harvester units 15. The cut crops are gathered by the crop gathering units 1, passed on to the collecting auger 14 and further to the throat.

The main advantage of a combine harvester utilizing the inventive adapter (header) is that the harvesting speed may be adjusted to actual field conditions. For instance, a higher harvester speed may be chosen for harvesting a clear and thin stand, whereas for harvesting down crops the technique of moving the combine with lowered speed into a direction opposite the direction of down stalks may be applied to reduce grain loss. Synchronizing the speed of the stalk gathering unit with the translation speed of the combine has the advantage—even on sloping terrain or in case down crops are harvested—that the stalk gathering unit acts upon the stalks only with a minimal force, providing only a slight supporting action. A further advantage of the inventive adapter (header) equipped with stalk shredder is that harvesting may be carried out very effectively, in a single step, utilizing the full potential of the combine harvester.

LIST OF REFERENCE NUMERALS 1 crop gathering unit
2 snout
3 frame structure
4 channel
5 stalk gathering unit
6 hydraulic motor
7 pump
8 cooler
9 filter
10 directional control valve
11 proportional valve
12 chain drive
13 oil tank
14 collecting auger
15 harvester unit
16 stalk shredder unit
17 housing
18 rotor
19 sliding disc
20 lever
21 lever
22 hydraulic cylinder

The invention claimed is:

1. A harvester adapter with stalk shredder for harvesting grain crops, comprising:
   a frame structure configured to be attached to a combine harvester;
   at least two crop gathering units each having a snout, the crop gathering units being secured to the frame structure, adjacent crop gathering units arranged such that a channel with an open leading end is formed therebetween;
   a stalk gathering unit disposed in driving connection with a harvesting mechanism on at least one side of each channel;

a collecting auger disposed rearward from the harvesting mechanism; and at least one stalk shredder unit attached to the frame structure, each stalk shredder unit having rotors disposed for rotation in a common housing, wherein the speed of the stalk gathering unit is continuously adjustable according to control orders received from at least one of the combine harvester, a speed meter disposed on the adapter, and an operator, the stalk shredder units are attached to the frame structure such that their position is adjustable with respect to the frame structure in a direction perpendicular to the direction of travel, and the stalk shredder units are suspended on the frame structure of the adapter by three articulated levers, where the length of a forward lever of the articulated levers is adjustable and the length of two rearward levers of the articulated levers is fixed and the rotors of the stalk shredder depend behind and below upper suspension points of the articulated levers with respect to the direction of travel.

2. The adapter according to claim 1, wherein
the stalk gathering units are driven by hydraulic drive means, the hydraulic drive means comprising a pump driven by a chain drive and a hydraulic motor, where the hydraulic motor is directly connected to the input shaft of the stalk gathering unit with an angular gear drive.

3. The adapter according to claim 1, wherein
the stalk shredder units are driven by hydraulic drive means, the hydraulic drive means comprising a pump driven by a chain drive, with one pump installed for each stalk shredder unit and the hydraulic drive means further comprising hydraulic motors adapted for driving the stalk shredder units.

4. The adapter according to claim 1, wherein two of the rotors disposed in the common housing are configured to counter-rotate with respect to each other.

5. The adapter according to claim 1, wherein
the stalk shredder units are configured to be retracted to a terminal position at which the stalk shredder units are substantially positioned against an underside of the frame.

* * * * *